United States Patent [19]

Ng

[11] Patent Number: 4,982,375

[45] Date of Patent: Jan. 1, 1991

[54] ACOUSTIC INTENSITY PROBE

[75] Inventor: Kam W. Ng, Barrington, R.I.

[73] Assignee: The United States of America as represented by the Secretary of the Navy, Washington, D.C.

[21] Appl. No.: 436,509

[22] Filed: Nov. 13, 1989

[51] Int. Cl.$^5$ .................... G01S 15/00; H04B 1/06
[52] U.S. Cl. ..................................... 367/135; 73/602
[58] Field of Search .................. 367/135; 73/646, 647, 73/648, 641, 602

[56] References Cited

U.S. PATENT DOCUMENTS 4,532,807  8/1985  Tomita et al. .................. 73/602

Primary Examiner—Thomas H. Tarcza
Assistant Examiner—Daniel T. Pihulic

[57] ABSTRACT

An acoustic intensity probe was developed to measure waterborne sound intensity levels using a two-hydrophone technique. The technique utilizes the cross-spectral density of signals from multiple closely spaced hydrophones. Planar (2-dimensional) and 3-dimensional arrays of hydrophones with symmetric and asymmetric configurations were developed to measure the acoustic intensity levels. This acoustic intensity probe combined with the two-hydrophone technique provides spcific information revelaing the acoustic energy distribution and propagation of noise sources in any acoustic environment.

6 Claims, 2 Drawing Sheets

ANGLES
0°    180°
60°   240°
120°  360°

ANGLES
0° TO 315°
AT 45° INCREMENTS

ANGLES
0° TO 342°
AT 18° INCREMENTS

ASYMMETRIC ARRAY

SYMMETRIC ARRAY

ASYMMETRIC ARRAY 4,982,375

ACOUSTIC INTENSITY PROBE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to applications of acoustic instrumentation. More particularly, there is described a means of obtaining acoustic energy distribution and propagation through the use of an acoustic probe utilizing an acoustic intensity technique.

(2) Description of the Prior Art

The characterization of transient noise sources in a reverberant sound field is technically very difficult. Although various techniques have been attempted, prior to the present invention the methodology was still far from satisfactory. A majority of the prior art techniques are based on correlation of signals, which is laborious and costly. Recently, a hand-held sound intensity probe was made commercially, but this device has limited applications.

SUMMARY OF THE INVENTION

It is an object of the present invention to provide waterborne acoustic energy distribution and propagation. It is a further object to measure sound intensity levels of transient noise sources.

These and other objects are achieved by spacing a plurality of hydrophones to measure sound pressure signals. The cross spectral density of selected pairs of the hydrophones is then obtained. From this the acoustic intensity in a particular direction is found.

DESCRIPTION OF THE PREFERRED EMBODIMENT

Figure 1:
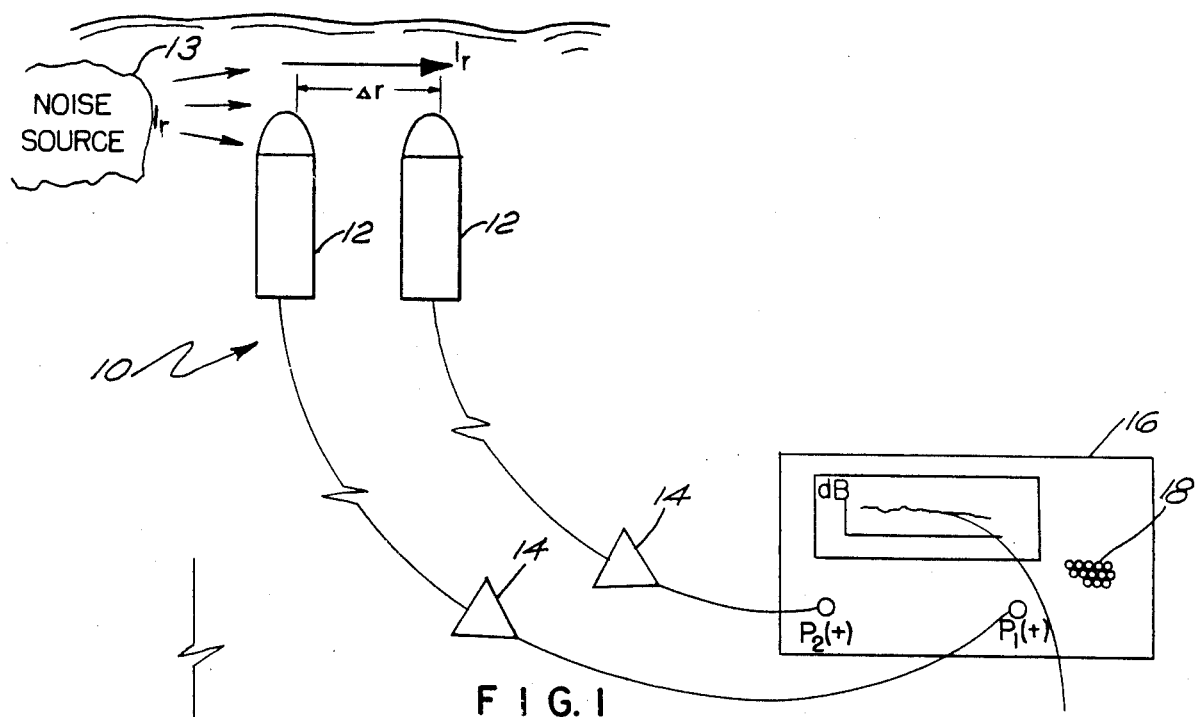
FIG. 1 is a diagram showing the acoustic intensity technique for a two hydrophone sound measuring system in accordance with the present invention.

Acoustic intensity levels are often used to quantify the sound source power and identify sound propagation paths. The present inventive acoustic intensity method quantifies these intensity levels utilizing the cross-spectral density of signals from two closely spaced acoustic sensors. A salient feature of the present invention is that it can be applied in any acoustic environment. Thus it is very attractive for noise measurement in a reverberant sound field.

The present invention makes us of the following mathematical theory:

Acoustic intensity, I, is a vector quantity and $I_r$, the intensity in the r direction, is given by $$I_r = E[P \cdot u_r], \qquad \text{(eq. 1)}$$

where E denotes the expected value, P is the acoustic pressure, and $u_r$, is the particle velocity in the r direction. The particle velocity $u_r$, in a zero mean flow sound field is the time integral of the pressure gradient. In complex notation it is expressed as $$u_r = -\frac{1}{\rho} \int \frac{\partial P}{\partial r} dt. \qquad \text{(eq. 2)}$$

Consider a sound measuring system (FIG. 1) comprising two hydrophones separated by a distance $\Delta r$. Hydrophones 1 and 2 measure the sound pressure signals, $P_1(t)$ and $P_2(t)$, respectively. The sound pressure at midpoint between the hydrophones can be approximated by $$P(t) \approx (\tfrac{1}{2})[P_1(t) + P_2(t)]. \qquad \text{(eq. 3)}$$

The acoustic velocity, $\bar{u}_r$, can be approximated as $$u_r(t) \approx -\frac{1}{\rho \Delta r} \int [P_2(t) - P_1(t)] dt. \qquad \text{(eq. 4)}$$

In order to present the dynamic quantities of pressure and velocity in the frequency domain, a Fourier transformation is required. The Fourier transforms of pressure and velocity are $$P(f) \approx \tfrac{1}{2}[P_1(f) + P_2(f)], \qquad \text{(eq. 5)}$$

$$u(f) \approx \frac{-1}{j2\pi f \rho \Delta r}[P_2(f) - P_1(f)] \qquad \text{(eq. 6)}$$

where $j = \sqrt{-1}$. In equation (6), the $j2\pi f$ term in the denominator comes from the integration in the frequency domain.

A variation of Parseval's Theorem states that the total intensity in the time domain is equal to the total intensity in the frequency domain, i.e., $$I_r(f) = E\{\int P(t)u(t)dt\} = E\{\int P(f)u^*(f)df\}, \qquad \text{(eq. 7)}$$

where * denotes the complex conjugate.

Substituting equations (5) and (6) into equation (7) results in $$I_r(f) = \frac{1}{4\pi f \rho \Delta r} E\{\int [|P_2|^2 - |P_1|^2] df\} + \qquad \text{(Eq. 8)}$$

$$\frac{1}{2\pi f\rho\Delta r} E\{\int [I_m(P_1 P_2^*)df]\}.$$

The contribution in acoustic intensity is from the second term of equation (8), i.e., $$I_r(f) = Im\{G_{12}\}/2\pi f\rho\Delta r, \quad \text{(Eq. 9)}$$

where $G_{12}$ is the cross-spectral density of $P_1(t)$ and $P_2(t)$, which can be easily obtained from a two-channel Fast Fourier Transform analyzer. In the state-of-the-art Fast Fourier Transform analyzer used a push button switch performs this function. In theory, equation (9) must satisfy the requirement $k\Delta r \ll 1$, where k is the wave number and $\Delta r$ is the separation between the two hydrophones. In practice $k\Delta r \approx 1$ provides a reasonable approximation for the upper limit of frequency range for the acoustic intensity measurement.

Refer now to FIG. 1 wherein there is shown a probe 10 having two hydrophones 12 that are spaced by a distance $\Delta r$. Acoustic signals emanate from a noise source 13. The signals measured by the hydrophones are $P_1(t)$ and $P_2(t)$. The signals go through signal conditioners and amplifiers 14 to a Fast Fourier Transform (FFT) analyzer 16. The cross-spectral density $G_{12}$ of $P_1(t)$ and $p_2(t)$ is obtained by operation of push button 18 of FFT analyzer 16.

Figure 2:
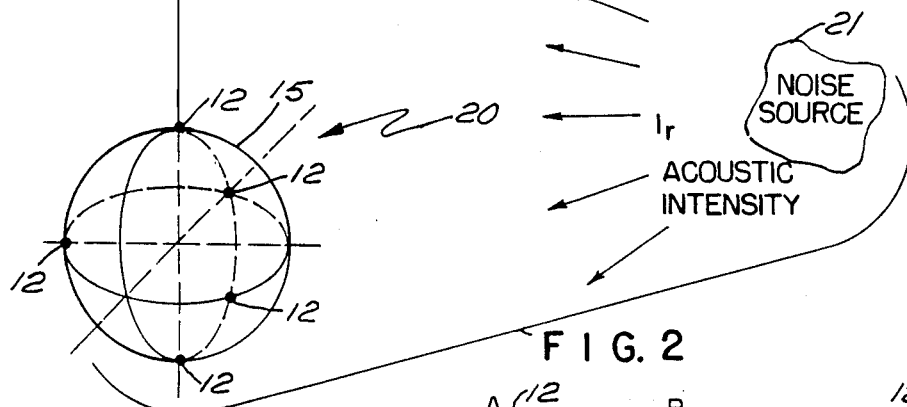
FIG. 2 shows an arrangement in which five hydrophones are spaced in a three dimensional array enclosing a spherical mesh in accordance with the present invention.

Refer now to the FIG. 2. An acoustic intensity probe 20 comprises a plurality of omni-directional hydrophones 12 arranged in a specific configuration. The hydrophones 12 are supported or attached to a spherical mesh 15 which is made from fine wire. The size and spacing of the hydrophones 12 should be relatively small compared to the distance to a noise source 21.

Figure 3:
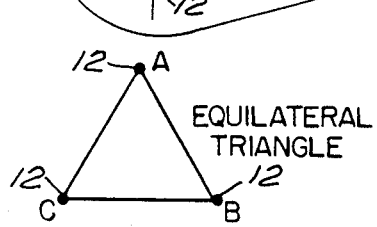
FIGS. 3, 4 and 5 show planar symmetric arrays for a sound measuring system in accordance with the present invention.
Figure 4:
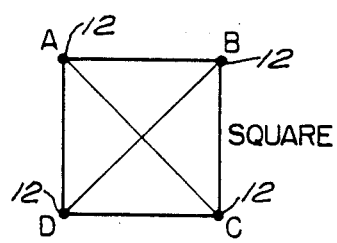
Figure 5:
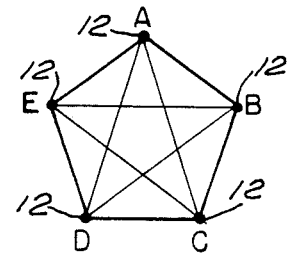
Figure 6:
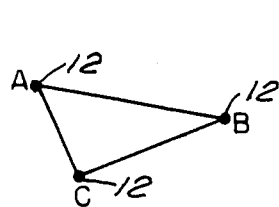
FIGS. 6, 7 and 8 show planar asymmetric arrays for a sound measuring system in accordance with the present invention.
Figure 7:
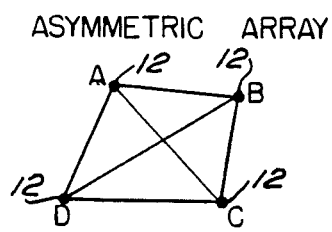
Figure 8:
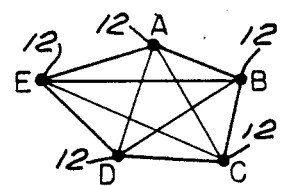

FIGS. 3, 4, and 5 show symmetrical arrangements of the hydrophones for two dimensional (planar) arrays for three, four and five hydrophones 12 respectively. FIGS. 6, 7, and 8 show asymmetrical arrangements of the same respective number of hydrophones for two dimensional (planar) arrays. The number of hydrophones employed depends on the angular resolution desired. All individual measurements are of pairs of hydrophones 12. Therefore, the number of angles is related to the number of hydrophones N via the expression of permutation, and is given by $$P(N,2) = N!/(N-2)! \quad \text{(Eq. 10)}$$

where $P(N,2)$ is the number of permutations, and ! is the factorial. Note that the symmetric array provide equal increments or angular intervals whereas the asymmetric arrays provide irregular angular intervals. As an example, FIG. 3 is symmetrical with three hydrophones. Therefore, from Eq. 10 it can be seen that six pairs of measurements can be made at an angular spacing of 60°. Each pair of hydrophones 12 is capable of two measurements 180° apart.

Figure 9:
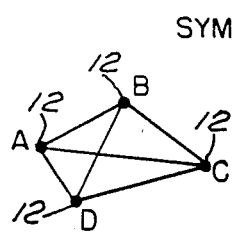
FIGS. 9 and 10 show three dimensional symmetric arrays for sound measuring systems in accordance with the present invention.
Figure 10:
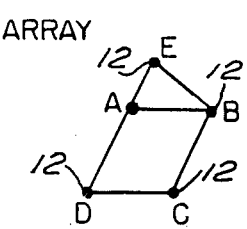
Figure 11:
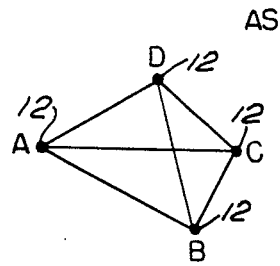
FIGS. 11 and 12 show three dimensional asymmetric arrays for sound measuring systems in accordance with the present invention.
Figure 12:
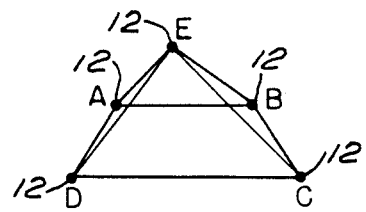

FIGS. 9-12, inclusive, show three dimensional arrays, with FIGS. 9 and 10 being symmetrical and FIGS. 11 and 12 being asymmetrical arrays. The relationship for the number of angles and hydrophones, and angular intervals are similar to the two dimensional case as discussed previously.

Figure 13:
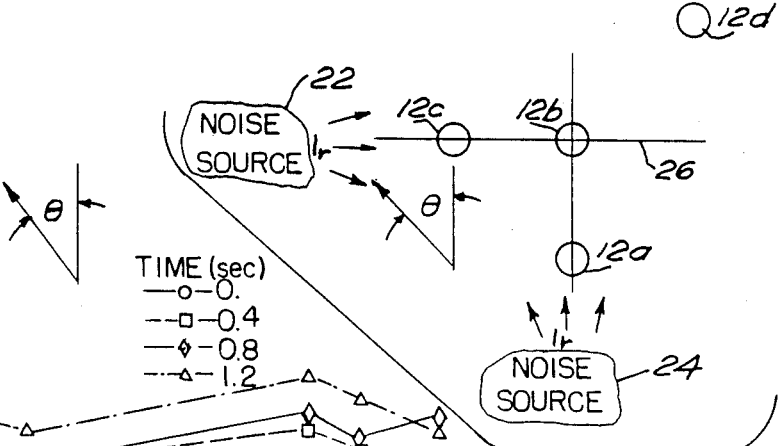
FIG. 13 shows an arrangement of hydrophones with a plurality of noise sources in accordance with the present invention.

Refer now to FIG. 13 for a description of the operation of a system. An acoustic intensity probe 20 is positioned in water in a sound field of interest. The probe 20 comprises a plurality of hydrophones 12a–d. Each of the hydrophones 12a–d is the same as those referred to with the numeral 12 in the previous figures. The letters a-d are added to distinguish one from the other in order to simplify the following explanation. Sound is produced by two noise sources 22 and 24. The hydrophones are placed in a planar array. A coordinate system 26 is shown with the angle 8 identified. The acoustic pressure of selected pairs within hydrophones 12a–d is measured. The acoustic intensity levels for a given pair within hydrophones 12a–d are calculated using equation (9). The imaginary part of the cross-spectral density $G_{12}$ is readily obtained by the analog method, i.e., from a two-channel FFT analyzer such as FFT analyzer 16 shown in FIG. 1. Alternately, $G_{12}$ can be obtained by the digital method via typical digital signal processing algorithms. Because of the different phase response of the two hydrophone channels, phase mismatch can cause measurement errors. This phase mismatch error often can be minimized as long as care is taken in calibration, monitoring, and precise matching of electronic components. The resultant noise directivity using this acoustic intensity method with the configuration of FIG. 13 is shown in FIG. 14.

Figure 14:
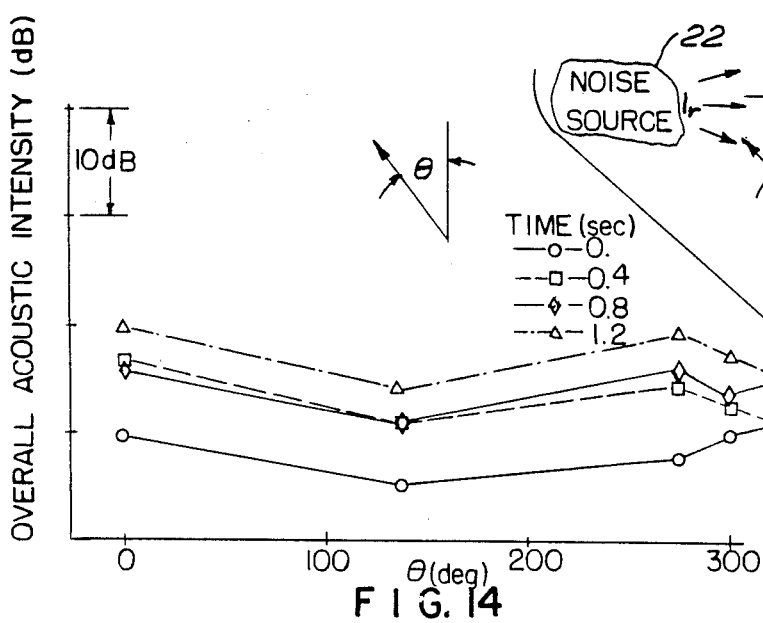
FIG. 14 is a diagram showing typical results obtained using the arrangement of hydrophones and noise sources shown in FIG. 13.

In FIG. 14, five measurements were taken at each of four different times and the acoustic intensity levels determined. The measurements at 0° was obtained using hydrophones 12a and 12b. The measurement at 135°. Were taken using 12b and 12d. The measurements at 270° were taken using 12b and 12c. The measurements at 300° were taken using 12d and 12c. The measurements at 330° were taken using 12d and 12a. It is to be noted that the highest acoustic intensity (dB) levels are found at 0° and 270°. This corresponds to the directions from which the two noise sources 22 and 24 emanate.

It will be understood that many additional changes in the details, materials, steps, and arrangement of parts, which have been herein described and illustrated in order to explain the nature of the invention, may be made by those skilled in the art within the principle and scope of the invention as expressed in the appended claims.

What is claimed is:

1. A method of obtaining acoustic intensity levels for transient sound pressure signals propagating in water comprising the steps of:

placing at least three hydrophones in a fine wire mesh to form an array probe, said probe remaining stationary in the water;

measuring said transient sound pressure signals using pairs of said at least three hydrophones wherein the sound pressure signals of each of said pairs of signals are $P_1(t)$ and $P_2(t)$; and obtaining the acoustic intensity levels, $I_r(f)$, for each pair of said at least three hydrophones with the magnitude and direction of the intensity vector being parallel to said pairs of hydrophones by use of the equation $I_r(f) = Im\{G_{12}\}2\pi f\pi\Delta r$ where $G_{12}$ is the cross-spectral density of said sound pressure signals $P_1(t)$ and $P_2(t)$, $\Delta r$ is the distance between hydrophones of each pair, and $\rho$ is the density of water.

2. A method of obtaining the acoustic intensity level according to claim 1 wherein a two-channel Fast Fourier Transform analyzer is used for the step of obtaining the acoustic intensity, $I_r(f)$.

3. A method of obtaining the acoustic intensity level according to claim 2 wherein said array is a symmetrical two dimensional array, said method yielding a two dimensional sound field.

4. A method of obtaining the acoustic intensity level according to claim 2 wherein said array is an asymmetrical two dimensional array, said method yielding a two dimensional sound field.

5. A method of obtaining the acoustic intensity level according to claim 2 wherein said array is a symmetrical three dimensional array, said method yielding a three dimensional sound field.

6. A method of obtaining the acoustic intensity level according to claim 2 wherein said array is an asymmetrical three dimensional array, said method yielding a three dimensional sound field.

* * * * *